United States Patent [19]

Bodine

[11] 4,265,129

[45] May 5, 1981

[54] ORBITING MASS OSCILLATOR WITH OIL FILM CUSHIONED BEARINGS

[76] Inventor: Albert G. Bodine, 7877 Woodley Ave., Van Nuys, Calif. 91406

[21] Appl. No.: 27,935

[22] Filed: Apr. 6, 1979

[51] Int. Cl.[3] .............................................. F16H 33/10

[52] U.S. Cl. .......................................... 74/61; 74/87; 308/9

[58] Field of Search ........................ 74/61, 87; 173/49; 175/55; 198/770; 209/366.5, 367; 299/14; 308/9; 366/128; 404/117

[56] References Cited

U.S. PATENT DOCUMENTS

| | | | |
|---|---|---|---|
| 2,501,158 | 3/1950 | Chilcott | 74/61 X |
| 3,446,084 | 5/1969 | Bodine | 173/49 X |
| 3,458,065 | 7/1969 | Douglass | 74/61 X |
| 3,477,237 | 11/1969 | Orkney | 173/49X |
| 3,486,387 | 12/1969 | Bray | 74/61 |
| 3,659,467 | 5/1972 | Serrell | 74/61 X |
| 3,866,480 | 2/1975 | Elliston | 309/9 X |
| 3,866,693 | 2/1975 | Century | 74/61 X |
| 4,067,244 | 1/1978 | Baumers | 74/61 |

*Primary Examiner*—Lawrence J. Staab
*Attorney, Agent, or Firm*—Edward A. Sokolski

[57] ABSTRACT

An orbiting mass oscillator for generating vibratory energy has an unbalanced rotor which is rotatably driven around the wall of a housing. Oil is fed to the housing with a longitudinal flow therein to provide a thick oil film between the rotor and the housing wall, thereby providing cushioning therebetween which dampens the effects of sharp jolting forces on the oscillator in situations such as where the oscillator is used to drive a drill or cutter against hard material or drives a transducer which is coupled to liquids. This damping or cushioning effect tends to prevent hard metal-to-metal contact between the rotor and the housing which would cause damage to these components. The oil film is efficiently driven ahead of the moving bearing surface by means of an inwardly curved leading edge on the rotor. This turned-in leading edge facilitates the movement of the rotor up on to the oil film which then separates the rotor from the housing and forms an effective cushion or dampener therebetween.

4 Claims, 8 Drawing Figures

ORBITING MASS OSCILLATOR WITH OIL FILM CUSHIONED BEARINGS

This invention relates to orbiting mass oscillators, and more particularly to such a device in which an effective oil cushion is formed between the rotor and housing of the oscillator.

In my U.S. Pat. No. 2,960,314, issued Nov. 15, 1960, various types of oscillators of the mechanical orbiting mass type are described. In this type of oscillator, a rotor member is orbitally driven around in a housing, this rotor member having an unbalanced mass such that sonic vibratory energy is generated thereby. As described in my U.S. Pat. No. 3,367,716, issued Feb. 6, 1966, this type of oscillator can be used quite effectively for cutting rock by a type of operation wherein unidirectional pulses are delivered to the cutter through a resonant vibration system, this end result being achieved by means of an acoustic rectifier. This type of rectifier operation often develops sharp jolting forces which are transferred through the resonant vibration system back to the oscillator which can result in sharp metal-to-metal contact between the rotor and the housing of the oscillator and cause serious damage to these components. This problem is encountered not only in earth and rock cutting operations, but also in sonic energy systems of the type described wherein the resonantly vibrating system involves the use of a transducer which feeds the vibratory energy into a liquid, such as described in my U.S. Pat. No. 3,740,028 to a non-resonant system, issued June 19, 1973. In this non-resonant type of system, when the power level reaches a level such that cavitation bubbles are formed, very high momentary peak pressures are developed when the bubbles collapse, these short duration high level impulses being transferred back into the oscillator with the same undesirable results as mentioned above.

The oscillator of the present invention overcomes the aforementioned shortcomings of the prior art by providing an effective oil cushion or dampener between the oscillator rotor and the opposing oscillator housing surfaces. This cushioning effect is enhanced by rounding the leading edges of the rotor inwardly so as to facilitate the initial passage of the oil between the rotor and the housing as the rotor rotates. A relatively thick film of oil is provided and the possibilities of this film being "wiped away" with the relative movement between the bearing surfaces is minimized by providing the aforementioned turned-in leading edge on the rotor in the nature of a "ski-nose" which enables the rotor to effectively ride up onto the layer of oil.

It is therefore an object of this invention to minimize the damaging effects that sharp jolting pulses developed in a load might have on the bearing surfaces of an orbiting mass oscillator.

It is a further object of this invention to provide an improved orbiting mass oscillator having an oil film cushion which is formed and maintained between its bearing surfaces, thereby minimizing wear at these surfaces particularly in the face of sharp jolting drive pulses.

Other objects of this invention will become apparent as the description proceeds in connection with the accompanying drawings, of which:

Figure 1:
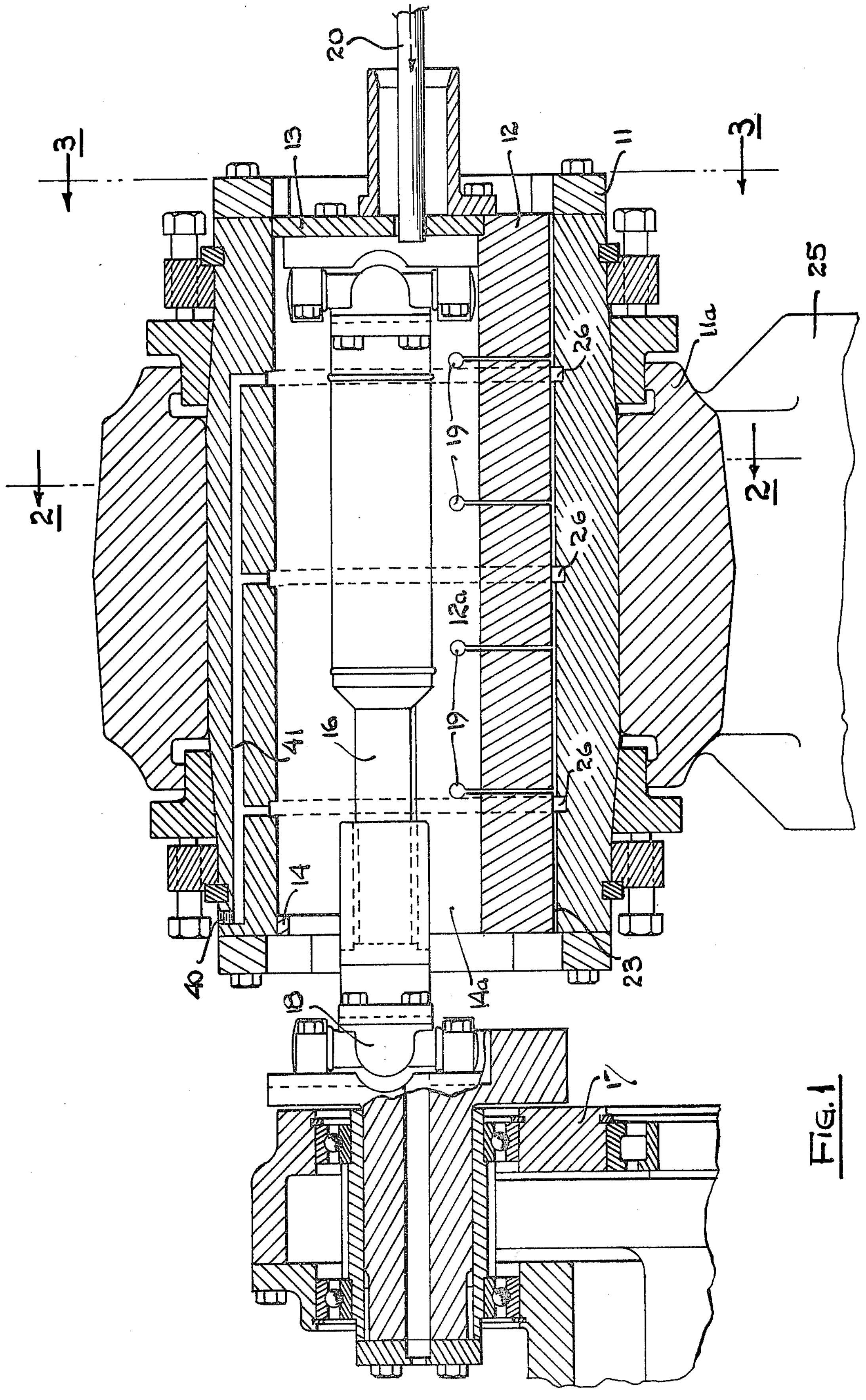
FIG. 1 is a cross-sectional view of a first embodiment of the invention.

Referring now to FIGS. 1-6, a first embodiment of the invention is illustrated. Oscillator housing 11 has a rotor member 12 mounted therein, this rotor member being in the general form of a crescent. The opposite ends of rotor 12 have end plates 13 and 14 which extend upwardly therefrom, plate 14 having an aperture 14*a* formed therein. Fixedly attached to end plate 13 is rotor drive shaft 16 which is coupled to gear box 17 by means of a universal joint 18. Oil is introduced into the housing through pipe 20, this oil preferably being a heavy lubrication oil, such as SAE 10-30. The oil flows along the top surface 12*a* of the rotor and passes from this surface through slots 19 formed through the rotor at spaced intervals along its length to the bearing surface 23 between the rotor and the inner wall of the housing.

The base portion 11*a* of the housing is attached to a load member which forms a resonant vibration system which may, for example, comprise an elastic drill column 25 such as shown and described in my U.S. Pat. No. 3,684,037, issued Aug. 15, 1972. A prime mover, such as an electric motor, gasoline engine, etc. (not shown), is coupled to gear box 17 and rotatably drives shaft 16 and along with it rotor 12 in an orbital path around the inner wall of housing 11. Shaft 16 passes through end plate 14.

Figure 2:
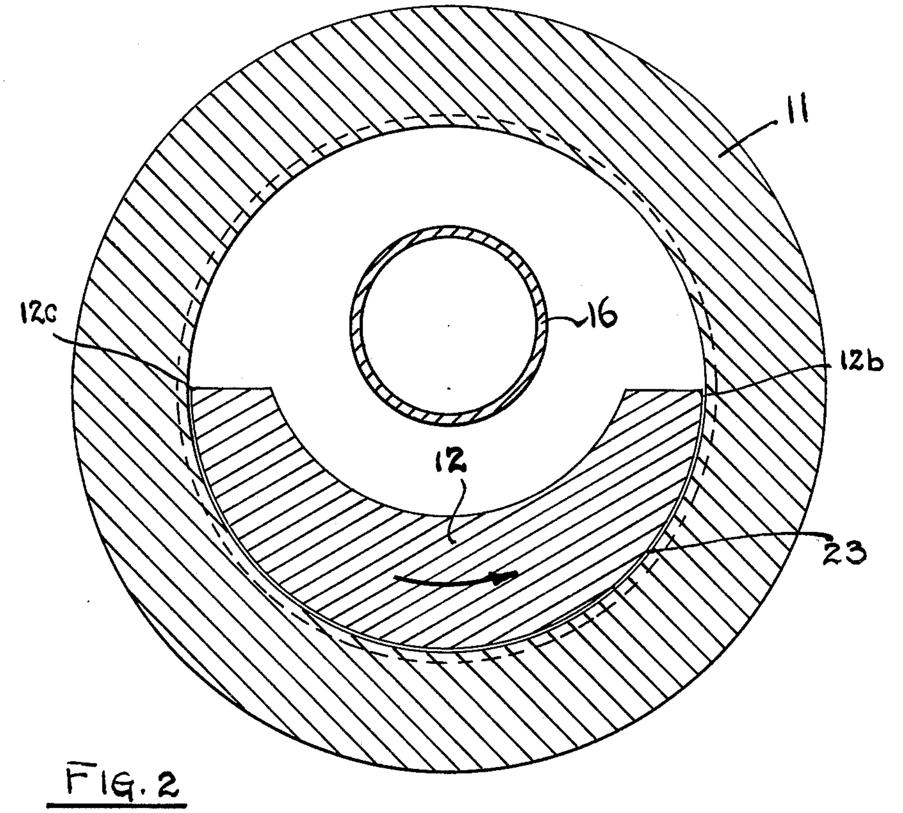
FIG. 2 is a cross-sectional view taken along the plane indicated by 2—2 in FIG. 1.
Figure 3:
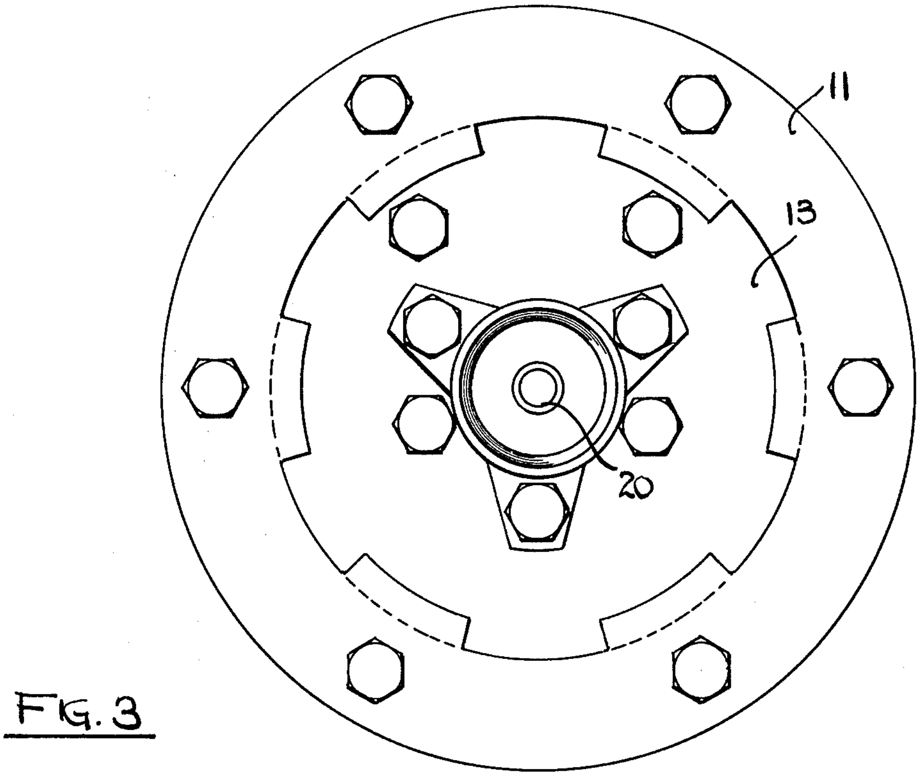
FIG. 3 is an end view taken along the plan indicated by 3—3 in FIG. 1.
Figure 4:
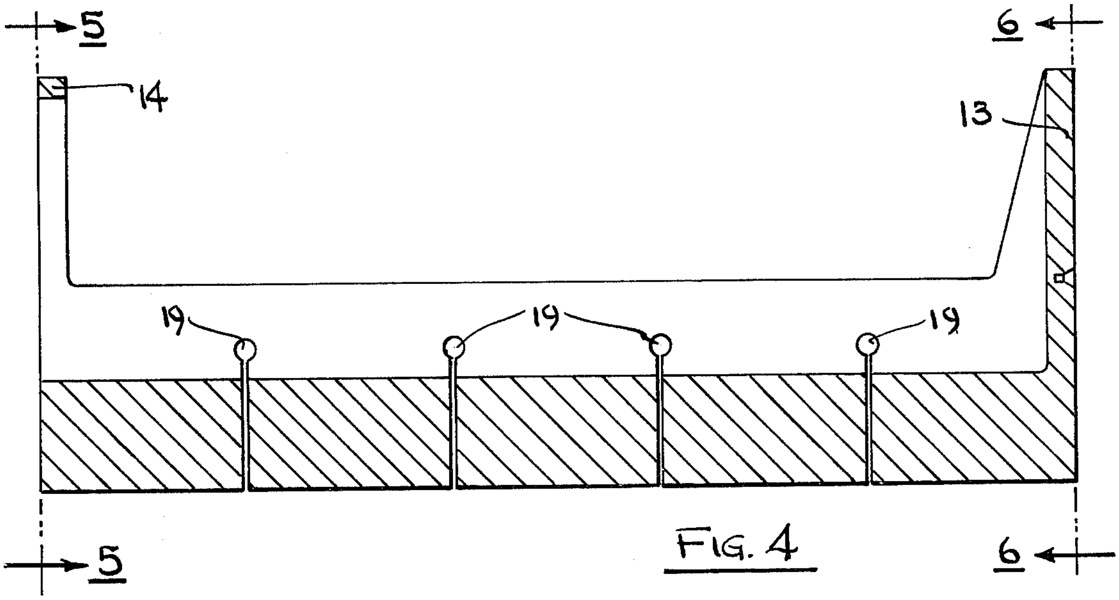
FIG. 4 is an elevational view in cross section of the rotor of the first embodiment.
Figure 5:
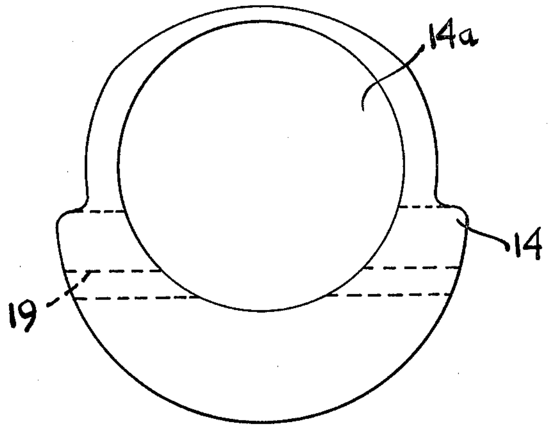
FIG. 5 is a view taken along the plane indicated by 5—5 in FIG. 4.
Figure 6:
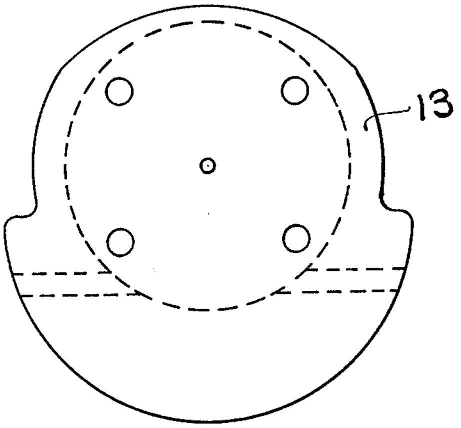
FIG. 6 is a view taken along the plane indicated by 6—6 in FIG. 4.

Rotor 12, as can best be seen in FIG. 2, has an inwardly curving leading edge portion 12*b* and a similarly inwardly curved trailing edge portion 12*c*, these edges being in the general form of a "ski-nose" such as to facilitate the passage of oil into the space between the rotor and the housing wall as the rotor rotates. In this manner, it is assured that the oil will not be wiped away with such rotation, but rather will be forced into the space between the rotor and the housing, thereby forming a thick cushioning film therebetween. Trailing edge 12*c* is made similar to leading edge 12*b* so that if reverse rotation of the rotor is desired, the same effect will be achieved.

With operation of the device, the oil becomes packed between the rotor and the housing to provide a cushion or dampener therebetween. Thus, when the rotor is rotated at a speed such as to cause resonant standing wave vibration of column 25, sharp vibrations on the column which may result when it strikes across hard rock formations will be effectively cushioned at the interface between the rotor and the housing so as to avoid damage to the rotor or housing at such interface. As already noted, this type of cushioning becomes particularly important where unidirectional "rectified" vibration pulses are being used to drive the cutter or the like against hard material such as a rock formation and also in non-resonant situations including where the load is a liquid in which cavitation might occur. The end pieces 13 and 14 act to keep the rotor centered within the housing bore when it is first started up. Circumferential grooves 26 are formed around the inner wall of housing 11 to facilitate the circulation of oil around the housing in lengthwise direction of the bore from groove to groove.

Figure 7:
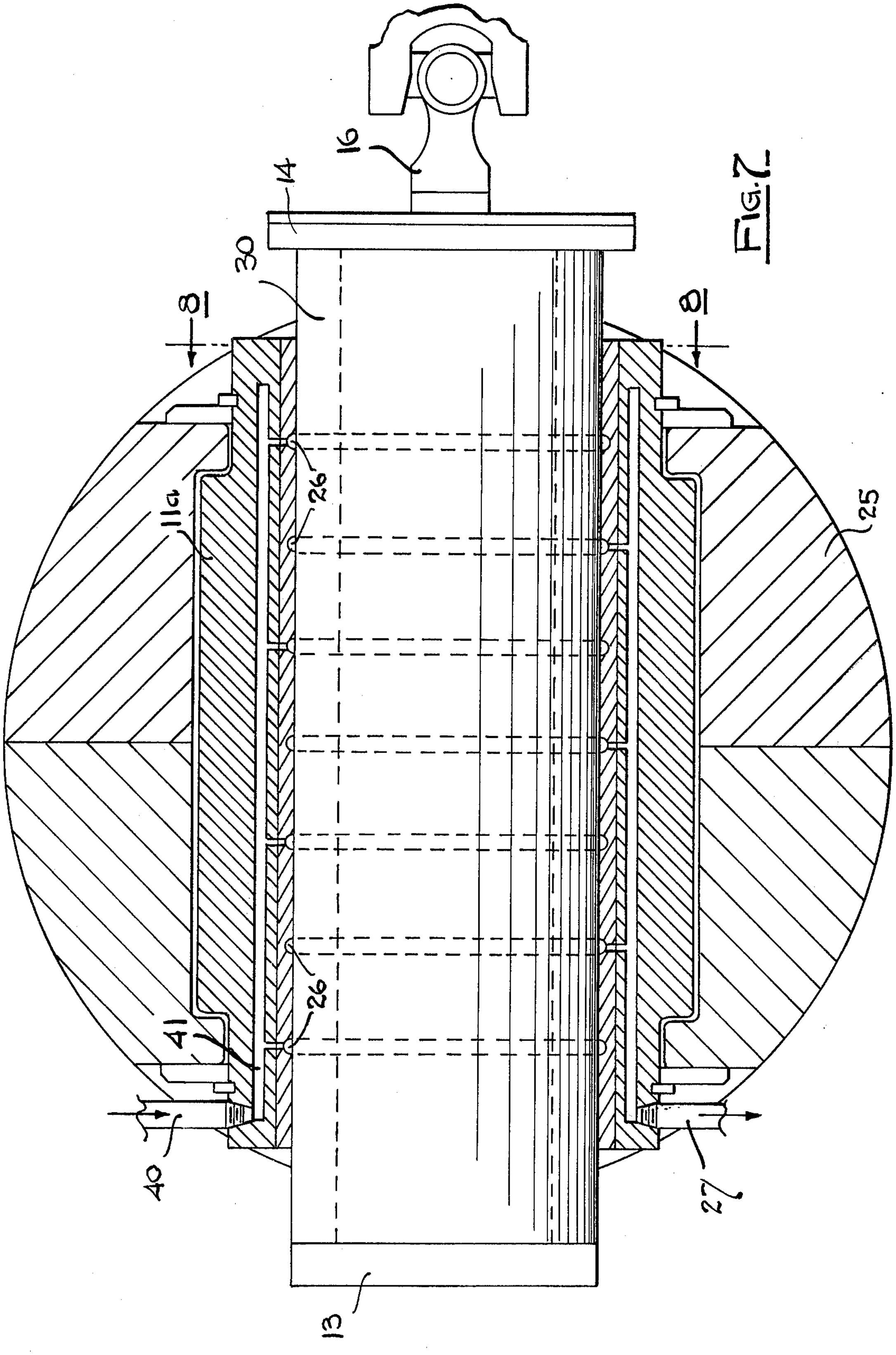
FIG. 7 is a top plan view in cross section of a second embodiment of the invention.
Figure 8:
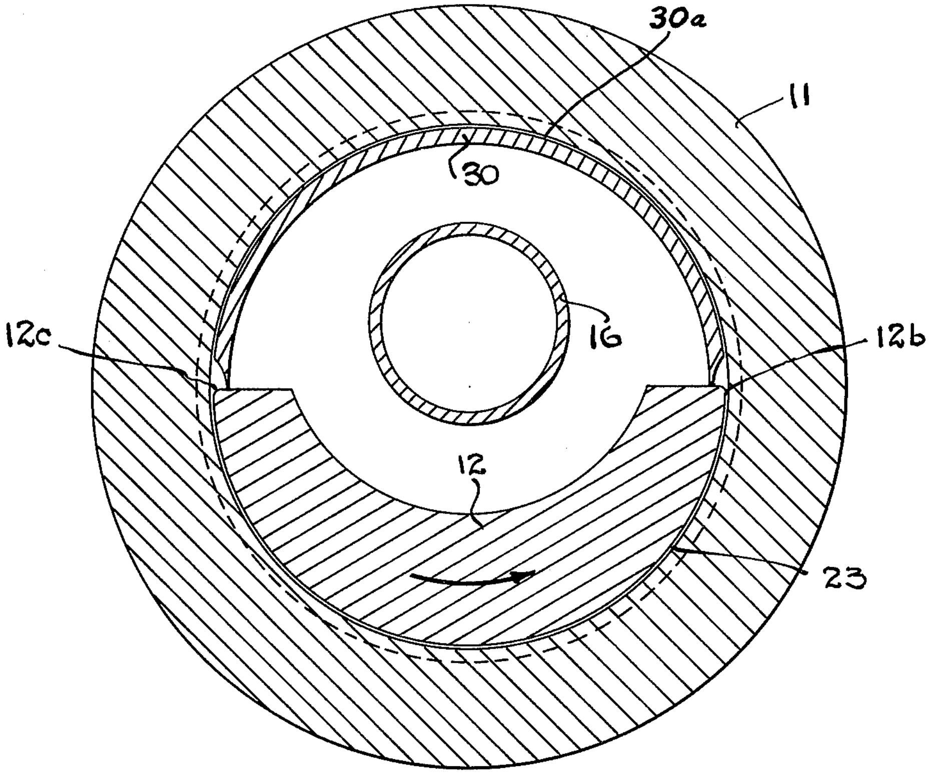
FIG. 8 is a cross-sectional view taken along the plane indicated by 8—8 in FIG. 7.

Referring now to FIGS. 7 and 8, a second embodiment of the invention is illustrated. This embodiment is the same as the first except for the addition of a "basket" member which fits on the top of the rotor in the form of an outer shell. Housing 11, driveshaft 16 and gear box 17 are essentially as for the first embodiment. However, in the second embodiment a basket structure 30 is placed on the top of rotor 12 forming a top shell therefor. Basket structure 30 is placed on or integrally formed with the main portion of rotor 12 with the outer wall 30*a* of this structure being recessed inwardly of the main portion 12 of the rotor about ⅛" in a typical operative embodiment having a rotor diameter of about 5". Thus, an approximately ⅛" space is provided between the outer wall of basket member 30 and the inner wall of the housing. As before, the leading and trailing edges 12*b* and 12*c* of the rotor are curved inwardly to facilitate the passage of the oil film between the rotor and the housing wall. Longitudinal oil flow from groove to groove is provided on the upper wall of the housing through an oil inlet 40 which is coupled to channel 41 formed in the housing, channel 41, in turn, being coupled to longitudinal flow inducing circumferential grooves 26 formed in the housing which circulate the oil lengthwise of the annulus and around the entire rotor and shell portion. Excess oil is permitted to flow out through oil outlet 27.

Thus, the oscillator of the present invention is provided with an effective oil film cushion or dampener at its rotation interface with the housing wall, this cushion being efficiently maintained by providing curved end leading edges for the rotor which effectively channel the cushioning oil between the opposing surfaces of these two members and avoids the oil being wiped away by this leading edge portion.

While the invention has been described and illustrated in detail, it is to be clearly understood that this is intended by way of illustration and example only and is not to be taken by way of limitation, the spirit and scope of this invention being limited only by the terms of the following claims.

I claim:

1. In an orbiting mass oscillator having an unbalanced arcuate rotor which is orbitally driven around a cylindrical housing for generating vibratory energy for delivery to a load wherein sharp jolting forces are developed, the improvement being means for providing cushioning between the rotor and the housing to dampen said forces comprising:

a supply of lubricating fluid to the bearing surfaces between the rotor and the housing, said rotor having a curving leading edge providing a wedge effect such that the rotor rides upon said fluid which forms a thick cushioning layer between the rotor and the housing, said rotor having a hollowed central portion and being in the form of first and second half cylinders, said first half cylinder forming an unbalanced rotor mass, said second half cylinder comprising a hollowed shell portion located in opposite relationship to the first half cylinder, there being a greater clearance space between the outer wall of said second half cylinder and the inner wall of the housing than between the outer wall of the first half cylinder and the inner wall of the housing, and means for flowing said fluid around said bearing surfaces.

2. The oscillator of claim 1 and additionally including first and second end plates extending substantially normally to the longitudinal axis of said rotor and a drive shaft for said rotor which passes through one of said end plates.

3. In an orbiting mass oscillator for generating vibratory energy for delivery to a load wherein sharp jolting forces are developed, said oscillator having an unbalanced cylindrical rotor which is orbitally driven rotationally on a journal bearing within a cylindrical housing, the improvement being for providing cushioning between the rotor and the housing to dampen said forces comprising:

a supply of lubricating fluid to the bearing surfaces between the rotor and the housing, said rotor including a first "loaded" portion having a substantial radially unbalanced distribution of mass and a second "unloaded" portion having a substantially lower mass than said first portion, there being a larger radial gap clearance between the unloaded portion of the rotor and the housing than between the loaded portion of the rotor and the housing and a curving leading edge on said rotor between said loaded and unloaded portions forming a fluid wedge tapering toward said loaded portion such that the loaded portion of the rotor rides up onto said fluid which forms a thick cushioning layer between the rotor and the housing, and means for flowing said fluid into and around said bearing surfaces.

4. The oscillator of claim 3 and additionally including first and second end plates extending substantially normally to the longitudinal axis of said rotor and a drive shaft for said rotor which passes through one of said end plates.

* * * * *